United States Patent
Friendshuh et al.

(10) Patent No.: US 9,280,477 B2
(45) Date of Patent: Mar. 8, 2016

(54) DATA STORAGE MANAGEMENT IN A MEMORY DEVICE

(75) Inventors: Luke W. Friendshuh, Elko, MN (US); Brian T. Edgar, Eden Prairie, MN (US); Mark A. Gaertner, Vadnais Heights, MN (US)

(73) Assignee: Seagate Technology LLC, Cupertino, CA (US)

( * ) Notice: Subject to any disclaimer, the term of this patent is extended or adjusted under 35 U.S.C. 154(b) by 316 days.

(21) Appl. No.: 13/292,169

(22) Filed: Nov. 9, 2011

(65) Prior Publication Data

US 2012/0151134 A1    Jun. 14, 2012

Related U.S. Application Data

(60) Provisional application No. 61/422,544, filed on Dec. 13, 2010.

(51) Int. Cl.
*G06F 12/00* (2006.01)
*G06F 13/00* (2006.01)
*G06F 13/28* (2006.01)
*G06F 12/08* (2006.01)

(52) U.S. Cl.
CPC ........ *G06F 12/0868* (2013.01); *G06F 12/0866* (2013.01); *G06F 2212/21* (2013.01); *G06F 2212/22* (2013.01); *G06F 2212/28* (2013.01); *G06F 2212/31* (2013.01); *G06F 2212/46* (2013.01)

(58) Field of Classification Search
CPC .................................................. G06F 12/0868
USPC ........................................................ 711/113
See application file for complete search history.

(56) References Cited

U.S. PATENT DOCUMENTS

| | | | | |
|---|---|---|---|---|
| 4,899,275 A | * | 2/1990 | Sachs | G06F 9/3802 711/128 |
| 5,586,291 A | * | 12/1996 | Lasker | G06F 11/1435 711/113 |
| 5,852,705 A | | 12/1998 | Hanko et al. | |
| 6,243,795 B1 | * | 6/2001 | Yang | G06F 11/1666 160/113 |
| 6,295,577 B1 | * | 9/2001 | Anderson | G06F 11/1441 711/111 |
| 6,516,426 B1 | | 2/2003 | Forehand et al. | |
| 6,826,630 B2 | | 11/2004 | Olds et al. | |

(Continued)

OTHER PUBLICATIONS

WOW: Wise Ordering for Writes—Combining Spatial and Temporal Locality in Non-Volatile Caches, Gill et al, FAST '05: 4th USENIX Conference on File and Storage Technologies Dec. 14-16, 2005 (14 pages).*

(Continued)

*Primary Examiner* — Sanjiv Shah
*Assistant Examiner* — Daniel C Chappell
(74) *Attorney, Agent, or Firm* — Westman, Champlin & Koehler, P.A.

(57) ABSTRACT

The disclosure is related to systems and methods of managing data storage in a memory device. In a particular embodiment, a method is disclosed that includes receiving, in a data storage device, at least one data packet that has a size that is different from an allocated storage capacity of at least one physical destination location on a data storage medium in the data storage device for the at least one data packet. The method also includes storing the at least one received data packet in a non-volatile cache memory prior to transferring the at least one received data packet to the at least one physical destination location.

20 Claims, 10 Drawing Sheets

(56) References Cited

U.S. PATENT DOCUMENTS

| | | | |
|---|---|---|---|
| 6,996,668 B2 | 2/2006 | Gaertner et al. | |
| 7,099,993 B2 | 8/2006 | Keeler | |
| 7,318,121 B2 | 1/2008 | Gaertner et al. | |
| 7,350,046 B2 | 3/2008 | Sicola et al. | |
| 7,966,450 B2* | 6/2011 | Klein | G06F 12/0866 711/102 |
| 8,015,433 B2* | 9/2011 | Chu | G11B 20/18 714/5.1 |
| 8,171,219 B2* | 5/2012 | Trika | G06F 12/0862 711/112 |
| 8,296,504 B2* | 10/2012 | Chu | G06F 12/0804 711/103 |
| 8,332,582 B2* | 12/2012 | Nakamura | G06F 3/0626 711/100 |
| 8,402,210 B2* | 3/2013 | Mannen | G06F 11/1076 711/113 |
| 8,412,884 B1* | 4/2013 | Ide | G06F 12/0871 711/113 |
| 8,621,144 B2* | 12/2013 | Eschmann | G06F 1/3221 711/103 |
| 2002/0029354 A1 | 3/2002 | Forehand et al. | |
| 2004/0174631 A1* | 9/2004 | Tanaka | G11B 19/04 360/75 |
| 2005/0055517 A1 | 3/2005 | Olds et al. | |
| 2005/0066121 A1* | 3/2005 | Keeler | G06F 12/128 711/113 |
| 2005/0240792 A1 | 10/2005 | Sicola et al. | |
| 2006/0075202 A1* | 4/2006 | Gaertner | G06F 11/2066 711/162 |
| 2006/0253650 A1* | 11/2006 | Forrer | G06F 12/0866 711/113 |
| 2007/0150693 A1* | 6/2007 | Kaneko | G06F 12/0246 711/202 |
| 2008/0040540 A1* | 2/2008 | Cavallo | G06F 3/0613 711/114 |
| 2008/0065845 A1* | 3/2008 | Montero | G06F 3/3225 711/162 |
| 2008/0109602 A1* | 5/2008 | Ananthamurthy | G06F 11/1076 711/114 |
| 2008/0147970 A1* | 6/2008 | Sade | G06F 12/0873 711/113 |
| 2009/0198888 A1* | 8/2009 | Mannen | G06F 11/1076 711/114 |
| 2009/0199217 A1 | 8/2009 | McBrearty et al. | |
| 2010/0332717 A1* | 12/2010 | Maeda | G06F 12/0246 711/3 |
| 2011/0161557 A1* | 6/2011 | Haines et al. | 711/103 |
| 2011/0320687 A1* | 12/2011 | Belluomini | G06F 12/0804 711/103 |
| 2012/0303872 A1* | 11/2012 | Benhase | G06F 12/0897 711/103 |

OTHER PUBLICATIONS

Write Caching, Charles M. Kozierok, Apr. 17, 2001, retrieved from http://www.pcguide.com/ref/hdd/op/cacheWrite-c.html on Jan. 11, 2014 (2 pages).*

Momentus 5400 PSD, Seagate, copyright 2007, retrieved from http://www.seagate.com/docs/pdf/datasheet/disc/ds_momentus_5400_psd.pdf on Aug. 14, 2013 (2 pages).*

22 File Caching, Spring 2000, retrieved from www.mpi-sws.org/~druschel/courses/os/lectures/fs-caching.ps.gz? Jan. 11, 2014 (2 pages).*

Product Manual Momentus 5400 FDE, Seagate, Aug. 2007, retrieved from http://www.seagate.com/staticfiles/support/disc/manuals/notebook/momentus/5400.2/PATA/100377037c.pdf on Jan. 11, 2014 (56 pages).*

Computer Architecture: A Quantitative Approach (Third Edition), Hennessy et al, May 31, 2002, ISBN-10 1558605957, ISBN-13978-1558605961, p. 683 (1 page).*

Data Storage—Logical Block Addressing (LBA), Nico Gerard, Sep. 21, 2010, retrieved from http://gerardnico.com/wiki/data_storage/lba on Jan. 11, 2014 (2 pages).*

What is disk cache, Webopedia, retrieved from http://www.webopedia.com/TERM/D/disk_cache.html on Jan. 11, 2014 (3 pages).*

The Unix and Internet Fundamentals HOWTO, Feb. 12, 2008, retrieved from https://web.archive.org/web/20080212162207/http://tldp.org/HOWTO/Unix-and-Internet-Fundamentals-HOWTO/memory-management.html on Feb. 25, 2015 (2 pages).*

WOW:Wise Ordering for Writes—Combining Spatial and Temporal Locality in Non-Volatile Caches, Gill et al, FAST'05 Proceedings of the 4th conference on USENIX Conference on File and Storage Technologies—vol. 4, 2005, retrieved from https://www.usenix.org/legacy/event/fast05/tech/full_papers/gill/gill.pdf on Feb. 25, 2015 (14 pages).*

The Unix and Internet Fundamentals HOWTO, Feb. 12, 2008, retrieved from https://web.archive.org/web/20080212162207/http://tldp.org/HOWTO/Unix-and-Internet-Fundamentals-HOWTO/memory-management.html on Jul. 7, 2015 (3 pages).*

* cited by examiner

DATA STORAGE MANAGEMENT IN A MEMORY DEVICE

CROSS-REFERENCE TO RELATED APPLICATION

The present application is based on and claims the benefit of U.S. provisional patent application Ser. No. 61/422,544, filed Dec. 13, 2010, the content of which is hereby incorporated by reference in its entirety.

BACKGROUND

Data storage devices are used to access digital data in a fast and efficient manner. At a host level, user data are often structured in terms of variable length files, which can be constituted from one or more fixed sized logical blocks (such as logical block addresses, LBAs).

To store or retrieve user data with an associated data storage device, host commands are generally issued to the device using a logical block convention. The device carries out an internal conversion of the LBAs to locate the associated physical blocks (e.g., sectors) of media on which the data are to be stored, or from which the data are to be retrieved.

When the data storage device is characterized as a disc drive, a controller may be used to execute a seek command to move a data transducer adjacent a rotating recording disc and carry out the data transfer operation with the associated physical sector(s). Other types of data storage devices (for example, solid state data storage devices that have no moving parts) generally carry out other types of access operations to transfer the associated data.

With continued demands for data storage devices with ever higher data storage and data transfer capabilities for a wide range of data types, there remains a continual need for improvements in a manner in which data associated with LBAs are transferred from a host to a data storage device, and a manner in which storage of the transferred data is managed within the data storage device. It is to these and other improvements that the present embodiments are generally directed.

SUMMARY

In a particular embodiment, a method is disclosed that includes receiving, in a data storage device, at least one data packet that has a size that is different from an allocated storage capacity of at least one physical destination location on a data storage medium in the data storage device for the at least one data packet. The method also includes storing the at least one received data packet in a non-volatile cache memory prior to transferring the at least one received data packet to the at least one physical destination location.

In another particular embodiment, a method is disclosed that includes temporarily storing received multiple data packets in a first cache memory in a data storage device prior to storing the multiple data packets in respective physical destination locations in the data storage device. The method also includes transferring the plurality of data packets and any existing data in the respective physical destination locations to a second cache memory.

In yet another particular embodiment, a device that includes a first cache memory, a non-volatile memory of a different type than the first cache memory, and a controller is disclosed. The controller is configured to temporarily store received data packets in the non-volatile memory. The controller is also configured to, when the received data packets reach a predetermined number of data packets, transfer the predetermined number of data packets to the first cache memory prior to storing the predetermined number of data packets in respective physical destination locations in the device.

DETAILED DESCRIPTION OF ILLUSTRATIVE EMBODIMENTS

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

The disclosure is related, in a particular example, to data storage management in systems with one or more storage entities. In one example, a storage entity can be a component that includes one or more memories accessible to a controller that is external to the storage entity. The systems and methods described herein are particularly useful for memory systems that employ data storage discs; however, the systems and methods described herein can be applied to any type of memory system, for example, to improve data storage management.

Figure 1:
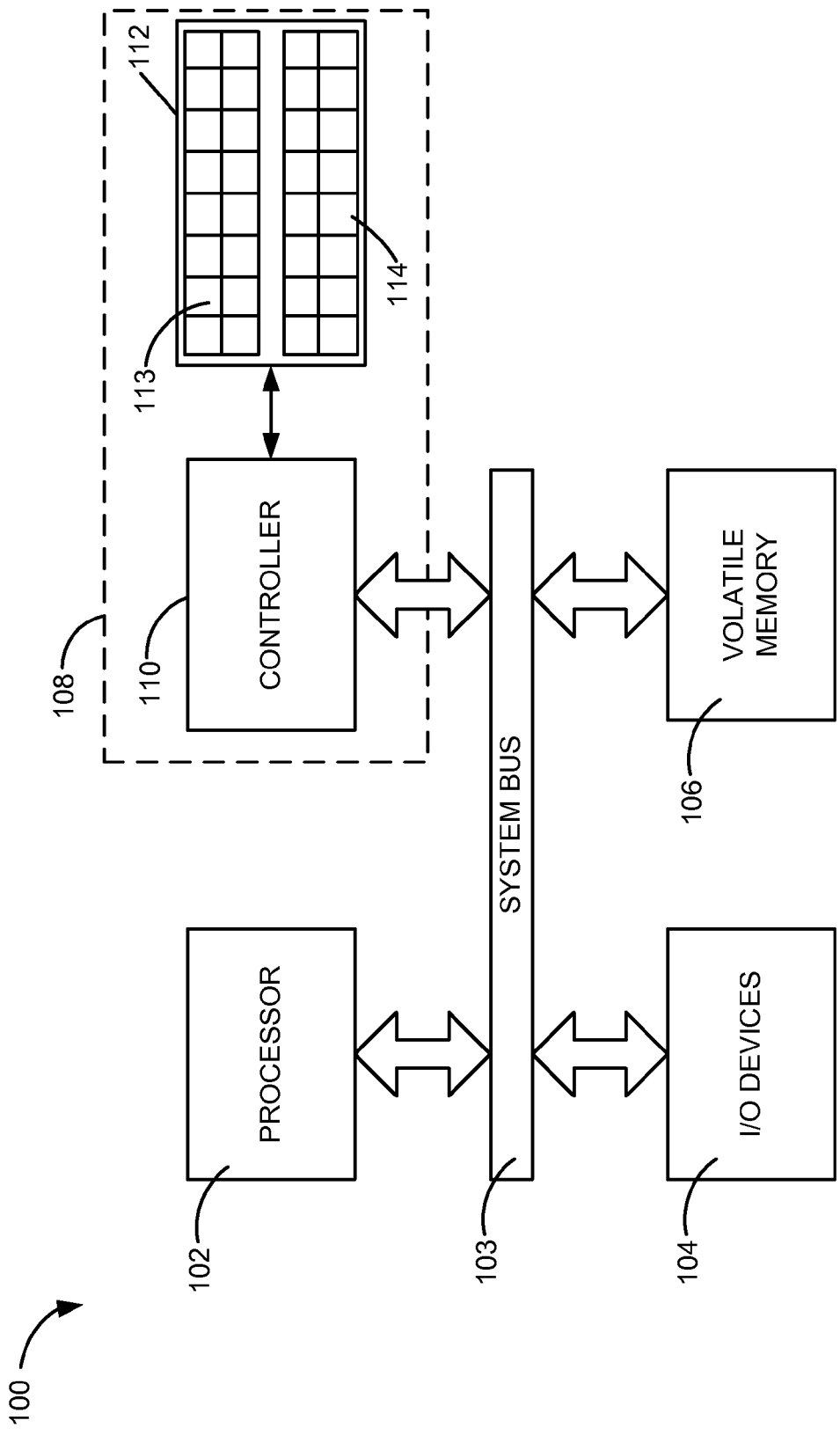
FIG. 1 is a diagram of an illustrative embodiment of a system of data storage management.

Referring to FIG. 1, a particular exemplary embodiment of a system of data storage management is shown and generally designated 100. The system of data storage management 100 may include a processor 102 connected to a system bus 103 which also can be connected to input/output (I/O) devices 104, such as a keyboard, monitor, modem, storage device, or pointing device. The system bus 103 may also be coupled to a memory 106, which may be a random access volatile memory. The system bus may additionally be coupled to a memory device 108.

The memory device 108 may include a controller 110, which may be coupled to the processor 102 via a connection through the system bus 103. In one embodiment, the memory device 108 comprises at least one storage entity 112. In a particular embodiment, storage entity 112 includes permanent storage locations 113 and cache memory locations 114. The cache memory locations 114 and the permanent storage locations 113 may be on a common storage medium or may be on separate storage media within storage entity 112.

During operation, the processor 102 may send commands and data to the memory device 108 to retrieve or store data. The controller 110 can receive the commands and data from the processor 102 and then manage the execution of the commands to store or retrieve data from storage entity 112.

In some embodiments, write commands received in memory device 108 from processor 102 or any other suitable sending interface include data addressed by logical block addresses (LBAs). Device 108 processes the received commands and ultimately stores the data accompanying the received commands in respective ones of the permanent storage locations 113, which are typically mapped to LBAs. In some such embodiments, individual ones of the LBAs may be substantially permanently associated with individual ones of the permanent storage locations 113. In other such embodiments, the LBAs are mutably associated with the permanent storage locations 113. For various reasons, some of which are described further below, performance of device 108 may be optimized by first temporarily storing the multiple received write commands in locations within cache memory 114, for example, and at a later time (for example, when device 108 is idle), transferring the data into permanent storage locations 113. In some embodiments, the transfer of the data associated with the multiple received write commands from the cache 114 is carried out in a particular manner. In one embodiment, a subset of the of the multiple write commands is selected for transfer to the permanent storage locations 113 based on proximity between LBAs of different ones of the multiple write commands. Further, the subset of the write commands may be executed in an order based on proximity between permanent storage locations 113 for individual ones of the subset of the write commands. In general, in such embodiments, the process of storing data included in received write commands is substantially optimized by grouping the received commands into different subsets based on proximity between LBAs of different ones of the multiple write commands, and then executing the different subsets of write commands based on proximity between permanent storage locations 113 on a data storage medium for individual ones of the respective subsets of the write commands.

In accordance with some embodiments, data sent from a sending interface to a device such as 108 may be in a form of packets that are sized smaller than a data region of a permanent storage location 113. For instance, the packets may be 512 bytes in length, whereas the data region of each permanent storage location 113 may be 1024 bytes in length, 1536 bytes in length, 2048 bytes in length, etc. Packets received from a sending interface that are of a different size (smaller or larger) than an allocated storage capacity of data storage regions of permanent storage locations 113 are referred to herein as unaligned packets. In such embodiments, certain processing needs to be carried out to properly accommodate the unaligned packets into the permanent storage locations 113. The processing can include first reading whatever data is currently stored on physical destination locations (specific ones of permanent storage locations 113), for the unaligned packets, into cache, modifying the current data with the data in the unaligned packets, and then writing the modified data to the respective specific ones of the permanent storage locations 113. This process is referred to herein as a "read-modify-write" process and is described in detail in connection with FIGS. 2 through 5.

Figure 2:
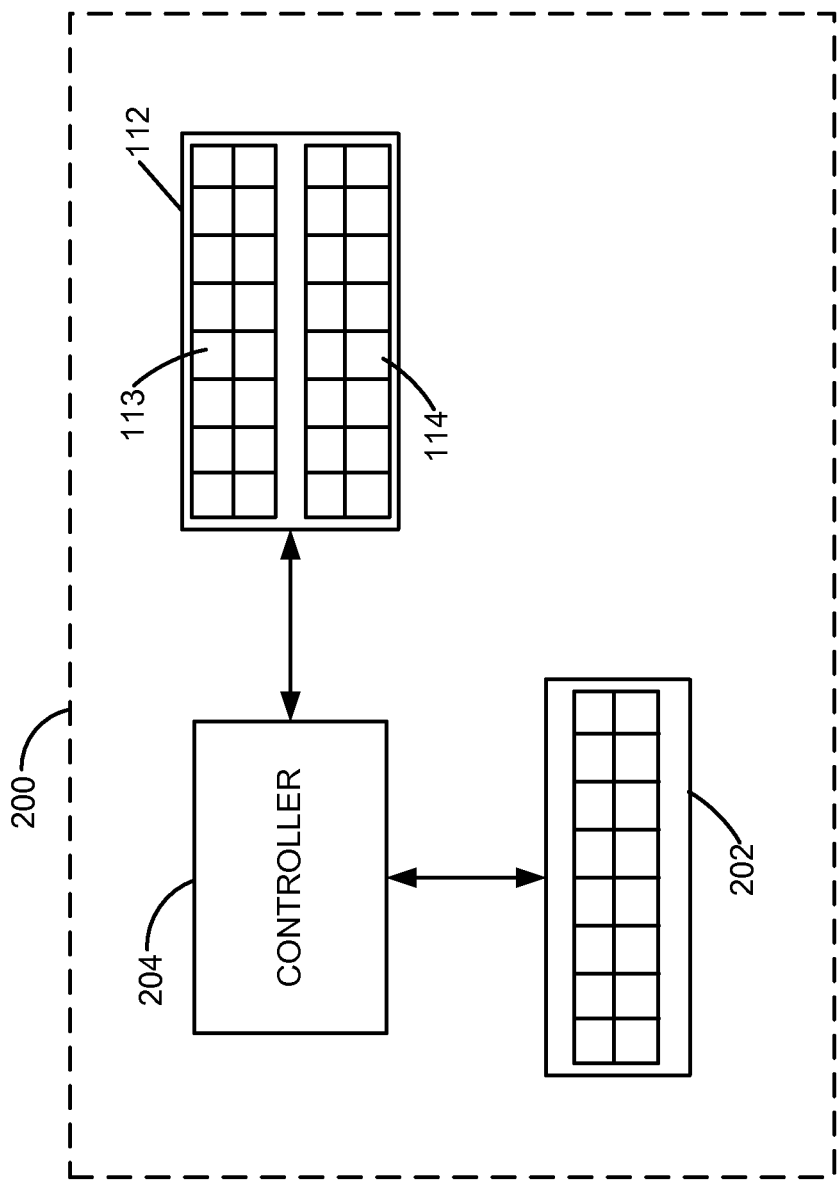
FIG. 2 is a diagram of a memory device in accordance with one embodiment.

FIG. 2 shows a memory device 200 in which a read-modify-write process may be carried out. As can be seen in FIG. 2, in addition to a first cache 114, which is similar to the cache of FIG. 1, device 200 includes a second cache 202 which is suitable for carrying out multiple steps of a read-modify-write process. The different operations described below are carried out under the control of a controller 204, which may be a processor that includes an integrated circuit. In one embodiment, write commands received by device 200 are first temporarily stored in second cache 202. When a number of commands stored in cache 202 reach a predetermined threshold, for example, they are transferred to first cache 114. The transfer of write commands from second cache 202 to first cache 114 may be carried out by reading the write commands from second cache 202 and storing the write commands in sequential memory locations of first cache 114. When memory device 200 is idle, for example, a read-modify-write process can be carried out for commands stored in first cache 114 that may include unaligned data packets, which have to be ultimately stored in specific ones of permanent storage locations 113. This process is carried out by transferring commands stored in first cache 114, and also transferring existing data from the specified ones of the permanent storage locations 113, into second cache 202. In second cache 202, data from the specified ones of the permanent storage locations 113 are updated with the unaligned data packets in the write commands. The updated data is then committed to the specified permanent storage locations 113. In some embodiments, the read-modify-write process takes into consideration proximity between LBAs of different ones of the write commands when carrying out data updates. In such embodiments, the controller 204 sorts or groups the write commands read into second cache 202 from first cache 114 based on proximity between LBAs of different ones of the transferred write commands. Specifically, the transferred write commands may be broken into smaller groups or subsets based on proximity between LBAs of the write commands. Updates of existing data from the specific ones of the permanent storage locations 113 transferred to cache 202 is carried out separately for each of the different subsets. In some embodiments, the updated data for the commands in each group or subset may be committed to the specified ones of the permanent storage locations or physical destination locations 113 based on proximity between physical destination locations in the memory 112 for the individual ones of the write commands in the respective subset. In some embodiments, second cache 202 can comprise multiple sections or even multiple memory chips with individual ones of the memory chips even being of different memory types. In one embodiment, second cache 202 can comprise a non-volatile portion and a volatile portion. These separate portions are not shown in FIG. 2. In such an embodiment, the non-volatile portion may be used to temporarily store write commands when they are first received from a sending interface. When the write commands in the non-volatile portion reach a predetermined threshold, they may be transferred to first cache 114. The volatile portion may be used by memory device 200 for temporary data storage while carrying out, for example, read-modify-write operations. Detailed embodiments for data caching and read-modify-write operations are provided below in connection with FIG. 3 through 5.

Figure 3A:
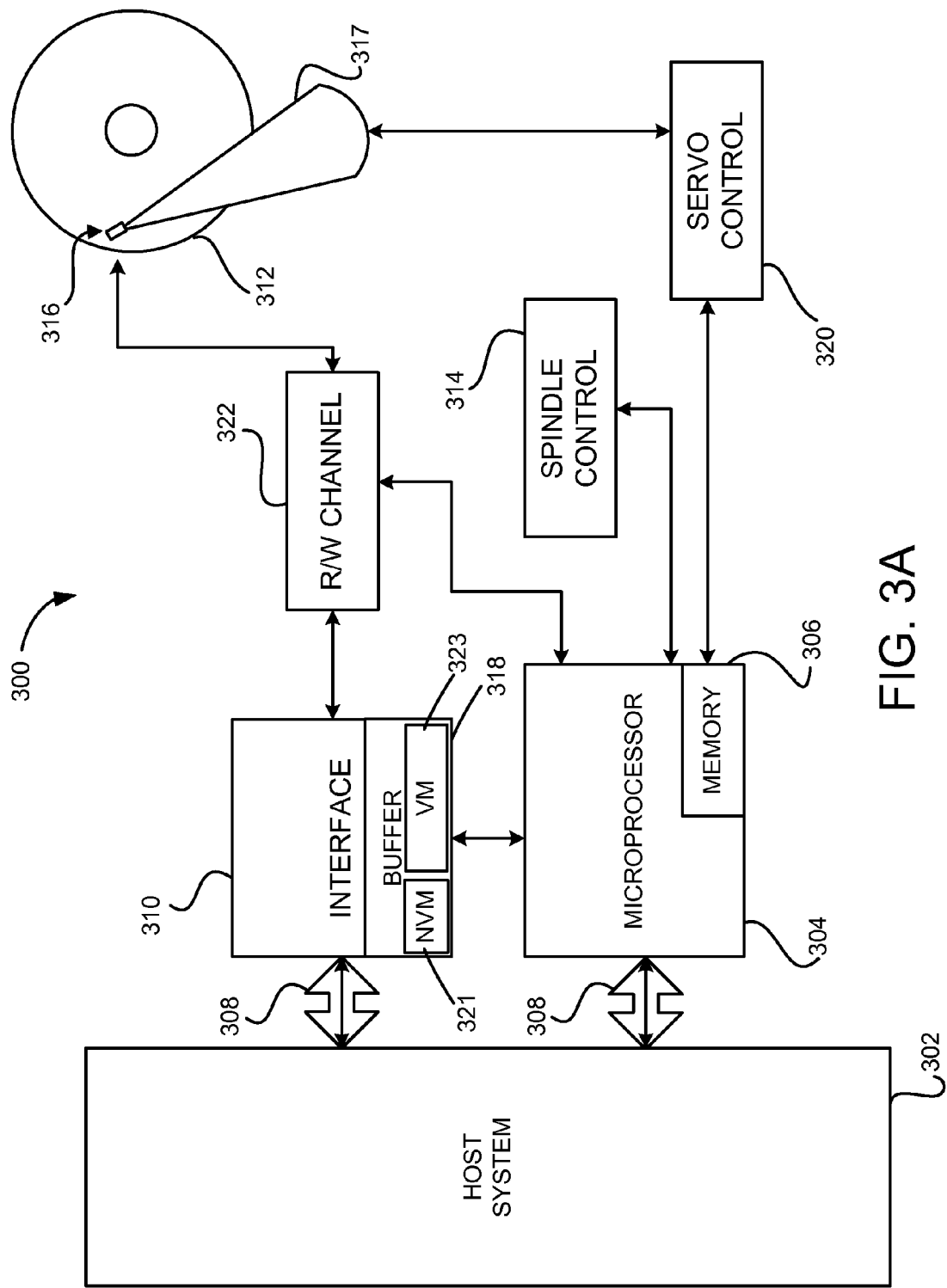
FIG. 3A is a block diagram of a data storage device in accordance with one embodiment.

FIG. 3A shows a block diagram of the disc drive 300 in accordance with one embodiment. Disc drive 300 is a particular example of a data storage device 108. Disc drive 300 is shown in FIG. 3A to be operably connected to a host computer 302 in which disc drive 300 may be mounted. Control communication paths are provided between host computer 302 and a disc drive microprocessor 304, the microprocessor 304 generally providing top level communication and control for disc drive 300 in conjunction with programming for microprocessor 304 stored in microprocessor memory (MEM) 306. Disc drive 300 may communicate with host computer 302 using a bus 308. Bus 308 may not be a single physical object, but rather a collection of cabling/wiring, for example, that, taken together, make up a communication channel between host computer 302 and disc drive 300. As such, bus 308 carries the cables/wires used to transfer data between a disc drive interface 310 and host computer 302 as well as the cables/wires used to transfer data between microprocessor 304 and host computer 302.

MEM 306 can include random access memory (RAM), read only memory (ROM), and other sources of resident memory for microprocessor 304. Disc drive 300 includes one or more data storage discs 312 that are described in detail further below in connection with FIG. 4. Discs 312 are rotated at a substantially constant high speed by a spindle control circuit 314. One or more heads 316 communicate with the surface(s) of discs 312 to carry out data read/write operations. The radial position of heads 316 is controlled through the application of current to a coil in an actuator assembly 317. A servo control system 320 provides such control. As will be described further below, portions of one or more disc 312 include cache memory locations that collectively constitute a first cache memory.

Data is transferred between host computer 302 and disc drive 300 by way of disc drive interface 310, which includes a buffer 318 to facilitate high speed data transfer between host computer 302 and disc drive 300. A substantial portion of a read-modify-write operation within drive 300 may be carried out within buffer 318, which is referred to hereinafter as a second cache memory. In one embodiment, second cache 318 is constructed from solid-state components. While the second cache memory is depicted in FIG. 3A as being physically co-located with interface 310, one skilled in the art should appreciate that second cache 318 may be electrically connected, yet physically separated from interface 310.

Data to be written to disc drive 300 are passed from host computer 302 to cache 318 and then to a read/write channel 322, which encodes and serializes the data and provides the requisite write current signals to heads 316. To retrieve data that have been previously stored by disc drive 300, read signals are generated by the heads 316 and provided to read/write channel 322. Interface 310 performs read signal decoding, error detection, and error correction operations. Interface 310 then outputs the retrieved data to cache 318 for subsequent transfer to the host computer 302.

Figure 3B:
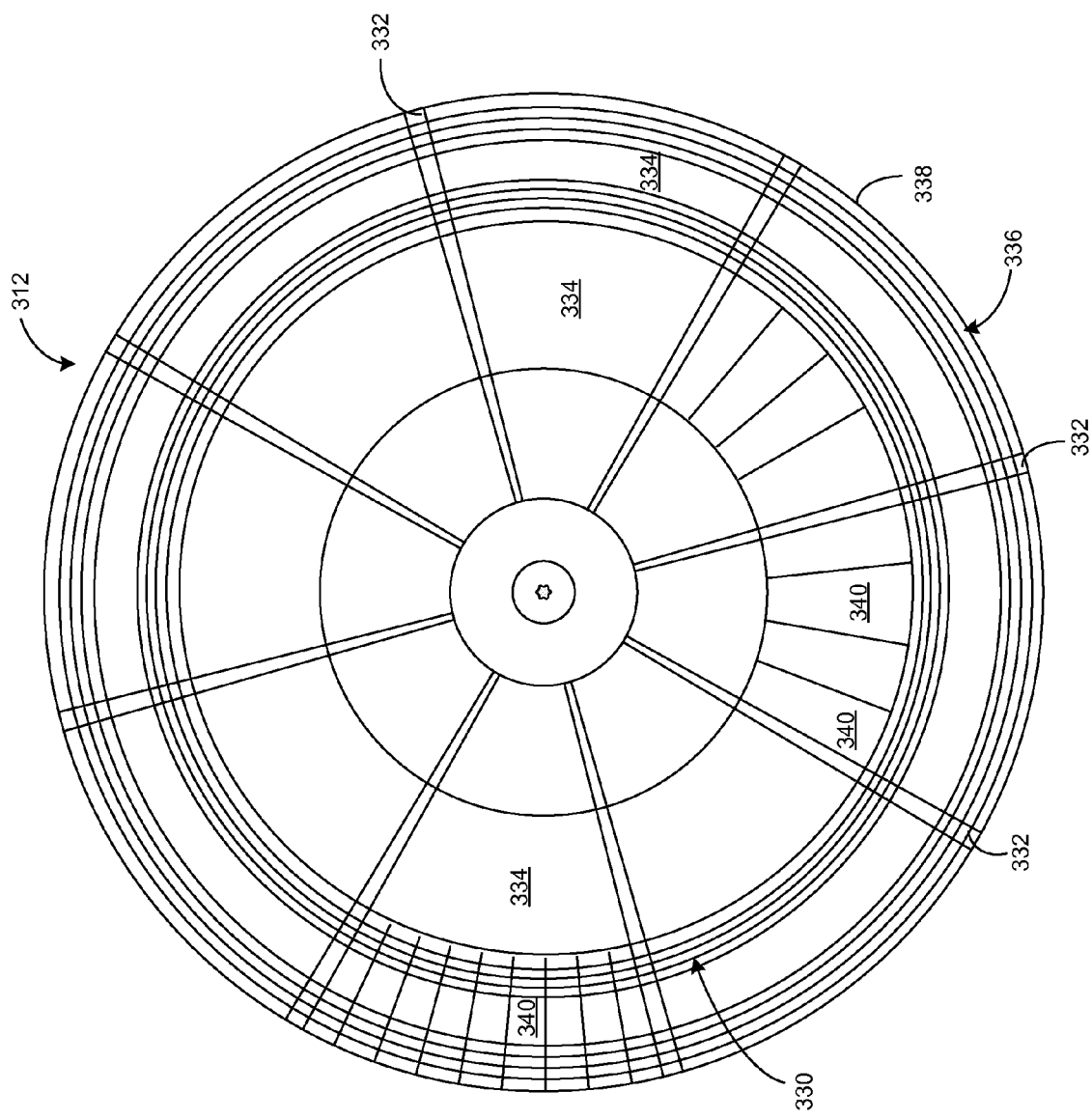
FIG. 3B is a diagram of a recording structure of a data storage medium of the data storage device of FIG. 3A.

FIG. 3B shows a recording structure of an exemplary data disc 312 in accordance with an embodiment. In this embodiment, a surface of disc 312 includes a number of concentric tracks 330. When configured with radial servo burst sectors 332, each disc track 330 is divided into slices called data wedges 334 between the burst sectors 332. Burst sectors 332 include data for maintaining accurate positioning of data head 316 (shown in FIG. 3A) over a track 330 and are positioned at predetermined spaced locations around the disc 312.

As the disc 312 rotates, data head 316 reads the servo information containing an address within the servo bursts 332 and sends the servo information back to servo control system 320. Servo control system 320 checks whether the address in the servo information read from burst sectors 332 corresponds to the desired head location. If the address does not correspond to the desired head location, servo control system 320 adjusts the position of head 316 to the correct track location.

As indicated above, each track 330 includes data wedges 334 containing stored user information. The number of data wedges 334 contained on a particular track 330 depends, in part, on the length (i.e. circumference) of the track 330.

Besides containing user information, each data wedges 334 may also include other data to help identify and process the user information.

In accordance with an embodiment, a portion of the disc 312 is reserved for use as a cache memory 336, which is hereinafter referred to as a first cache memory. First cache memory 336 is shown in FIG. 3B as being a circumferential grouping of tracks 330 located proximate to an outer diameter 338 of disc 312. First cache portion 336 shown in FIG. 3B is exemplary and it should be apparent to those skilled in the art that this portion 336 may include any number of tracks 330 and also may be on any region (circumferential or radial) of disc 312.

Disc drive 300 uses first cache 336 in conjunction with second cache 318 in order to manage data as the data is being transferred to and from its intended destination track 330 on disc 312. Because first cache 336 is located on, for example, magnetic media (i.e., disc 312), first cache 336 generally has a slower access time than second cache 318. However, first cache 336 has the advantage of larger storage and a less expensive cost per unit of storage than second cache 318. As such, in an embodiment, disc drive 300 manages the caching of data using each of the first cache 336 and the second cache 318 based on the access time of each and the available capacity of each.

To illustrate the commission of unaligned packets of data from a sending interface (e.g., the host computer 302) to a data storage disc 312, FIGS. 4A through 4F collectively illustrate a computer-implemented process for recording a stream of seven data packets to disc 312 in accordance with an embodiment. This process is generally described below as a series of operations, acts or processes performed by the disc drive 300 managing storage of data to the disc 312. It should be appreciated that any single or multiple components, either firmware or hardware, of the drive 300 may be used to perform these operations, acts or processes.

Figure 4A:
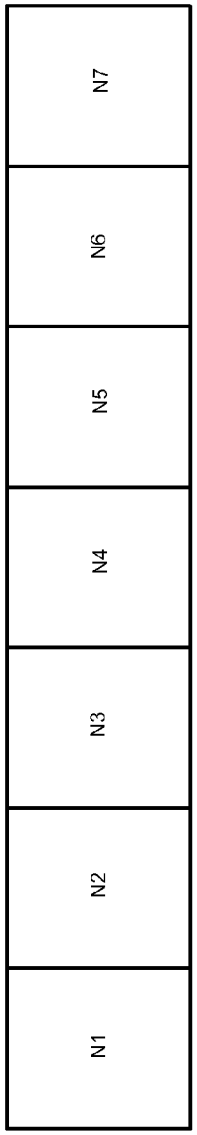
FIG. 4A is a logical representation of a stream of data packets sent from a sending interface to a data storage device for storage to recordable media in accordance with one caching process embodiment.

The seven data packets included within the stream sent from the sending interface are shown in FIG. 4A as data packets N1, N2, N3, N4, N5, N6, and N7. The data packets N1, N2, N3, N4, N5, N6, and N7 may be sent by the sending interface as part of one or more write commands. In one embodiment, the data packets N1, N2, N3, N4, N5, N6, and N7 are first temporarily stored in second cache 202 and may be part of "n" packets of data stored therein. When the number of packets (n) stored in second cache 318 reaches a predetermined threshold, for example, the packets may be transferred to first cache 336.

The first cache 336 and second cache 318 may take on any structure known to those of skill in the art for caching data, for example, in an embodiment, data packets are stored in these cache memories in cache, or buffer, sectors (not shown). In this embodiment, the sectors of second cache 318 are sized to hold only a single data packet sent from host computer 302. In contrast, sectors of first cache 236 are sized to hold one or more data packets send from host computer 302, by way of second cache 318. Thus, whereas sectors of second cache 318 are operable to hold one packet each, the sectors of first cache 336 are operable to hold "p" data packets each, where "p" is typically an integer number of data packets. These sectors may be of any length, but to illustrate FIGS. 4B through 4F, these sectors are substantially equal in length to the exemplary data packets N1, N2, N3, N4, N5, N6, and N7.

Figure 4B:
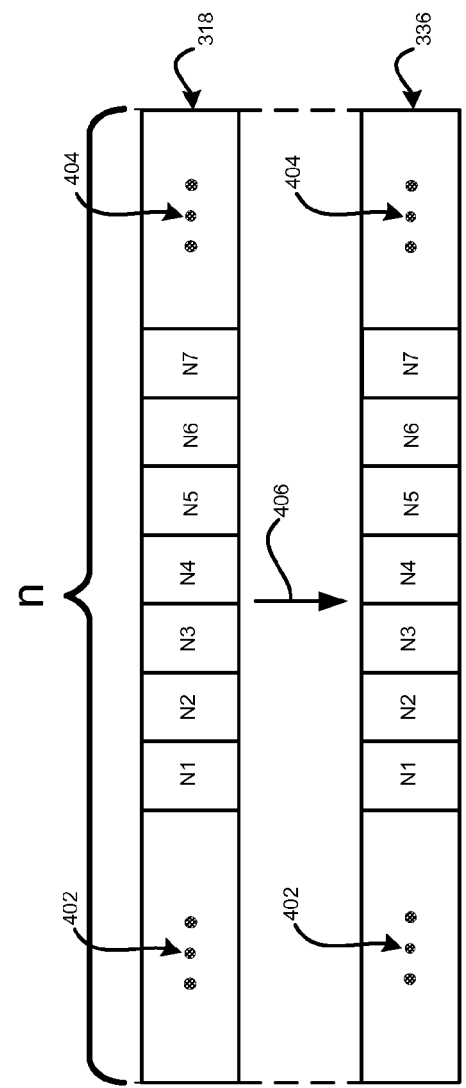
FIGS. 4B through 4F depict a logical structure of storage and caching regions for administering the caching process used to effectuate the storage of the stream of data packets of FIG. 4A to the recordable media.

FIG. 4B illustrates a logical representation of a transfer of "n" data packets from the second cache 318 to the first cache 336. In FIG. 4B, only data packets N1, N2, N3, N4, N5, N6, and N7 are shown separately and the remaining ones of the "n" data packets are represented by repetition dots 402 and 404. Arrow 406 indicates the transfer of the "n" data packets from second cache 318 to first cache 336. It should be noted that, although FIG. 4B is illustrated with the "n" data packets in both caches 318 and 336, the "n" packets no longer remain in cache 318 after the transfer to cache 336.

As indicated earlier, when memory device 300 is idle, for example, a read-modify-write process can be carried out for packets stored in first cache 336. Although the read-modify-write process may involve all, or a substantial portion, of the "n" packets stored in first cache 336, in the interest of simplification, the read-modify-write process is described for only packets N1, N2, N3, N4, N5, N6, and N7.

Figure 4C:
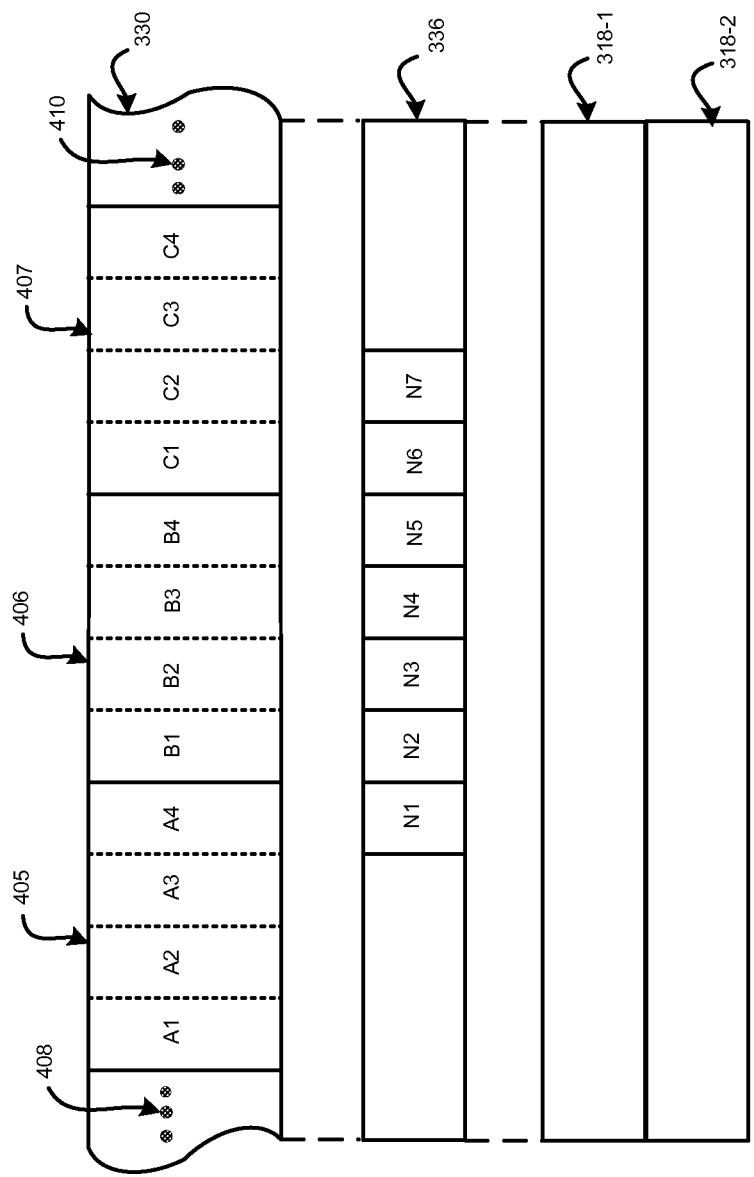

FIGS. 4C through 4F illustrate logical representations of a track 330 on disc 312 and two portions, 318-1 and 318-2, of second cache 318. FIG. 4C additionally shows a logical representation of a portion of first cache 336. In the embodiment described by the illustrations of FIGS. 4C through 4F, the packets N1, N2, N3, N4, N5, N6, and N7 are all destined for a single track 330 on disc 312 for illustrative purposes. It is equally contemplated that these packets N1, N2, N3, N4, N5, N6, and N7, or any sequence of packets for that matter, may instead be destined, and therefore recorded to, more than one track 330 on disc 312.

Track 330 includes a plurality of sectors 340 (shown in FIG. 3B), of which only a logical representation of a first exemplary sector 405, a second exemplary sector 406 and a third exemplary sector 407 are shown in FIGS. 4C through 4F. These sectors 405, 406 and 407 are the primary storage locations on disc 312 for the data packets N1, N2, N3, N4, N5, N6 and N7. For purposes of this example, the logical representations of first sector 405, second sector 406 and third sector 407 represent contiguous sectors 304 on track 330. Other sectors 340 exist on track 330 and may be located both prior to and after the three contiguous exemplary sectors 405, 406 and 407, as depicted by the repetition dots 408 and 410.

Initially, and in accordance with an exemplary embodiment only, data which had been previously written to disc 312 is stored on the three contiguous sectors 405, 406 and 407, which are each 2048 bytes in length, and thus, operable to each store four standard 512 byte packets issued from a sending interface (e.g., host computer 302) to disc drive 300. As such, first sector 405 initially holds four 512 byte entries of data (e.g., packets): A1, A2, A3, and A4; second sector 406 initially holds four 512 byte entries of data (e.g., packets): B1, B2, B3, and B4; and third sector 407 initially holds four 512 byte entries of data (e.g., packets): C1, C2, C3, and C4. Each of the regions of the sectors 405, 406 and 407 storing these entries of data (A1-A4, B1-B4 and C1-C4, respectively) are shown divided by dashed lines in FIGS. 4C through 4F.

FIGS. 4C through 4F are described below using an example that illustrates processes of an embodiment wherein the sending interface (e.g., host system 302) issues one or more write commands requesting that data packets N1, N2, N3, N4, N5, N6, and N7 are stored as follows: (a) packet N1 is to be written over data entry A4 stored on first sector 405; (b) packets N2, N3, N4 and N5 are to be written over all data entries (B1, B2, B3 and B4) stored on second sector 406; and (c) packets N6 and N7 are to be written over data entries C1 and C2 stored on third sector 407.

For purposes of illustration, indication of destination between any of track 330, first cache 336, and portions 318-1 and 318-2 of second cache 318, is shown with vertical alignment of data. That is, data will be copied or moved up and down vertical columns as it is manipulated. This is for purposes of illustration. One skilled in the art should appreciate that there are well-established mechanisms for recording sector addresses to which cached data is to be written.

Referring to FIG. 4C, prior to the read-modify-write process, track 330 is shown storing data packets A1-A4, B1-B4 and C1-C4. Also, first cache 336 is shown initially storing the stream of data packets N1-N7, which were transferred to the first cache 336 prior to the read-modify-write process. Further, the two portions 318-1 and 318-2 of the second cache memory 318, which are utilized for storing data packets N1-N7, and data packets A1-A4, B1-B4 and C1-C4, respectively, during the read-modify-write process, are shown initially empty in FIG. 4C.

Figure 4D:
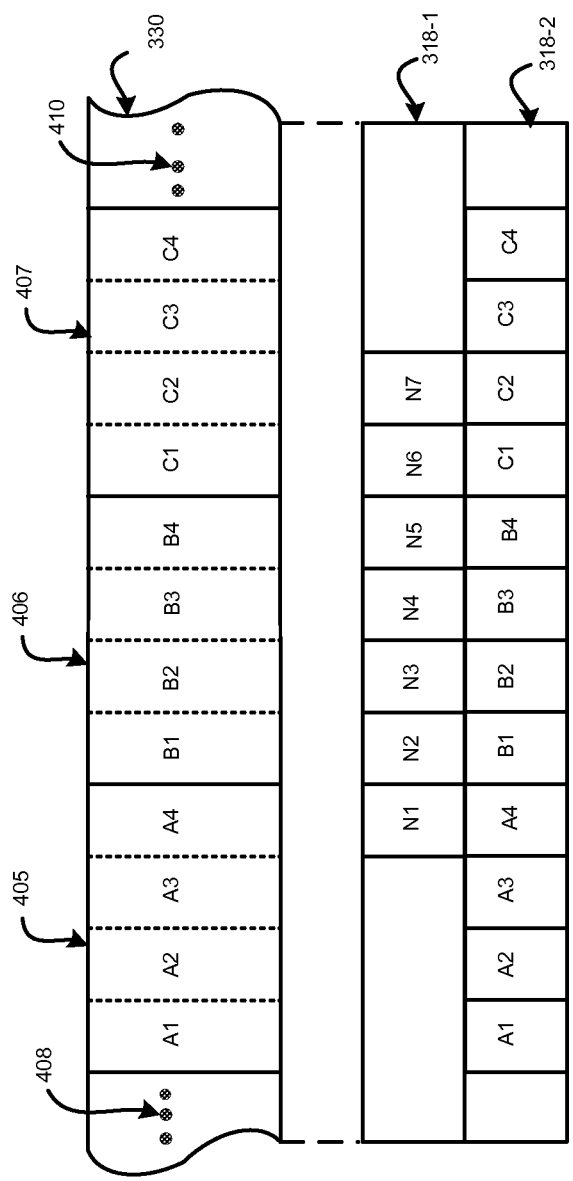

Disc drive 300 moves packets N1-N7 from first cache 336 to first portion 318-1 of second cache 318. Also, disc drive 300 copies all data entries A1-A4, B1-B4 and C1-C4 from sectors 405, 406 and 407, respectively, and stores the entry copies in second portion 318-2 of second cache 318. The results of these operations, which encompass the "read" aspects of the read-modify-write process, are illustrated in FIG. 4D.

Figure 4E:
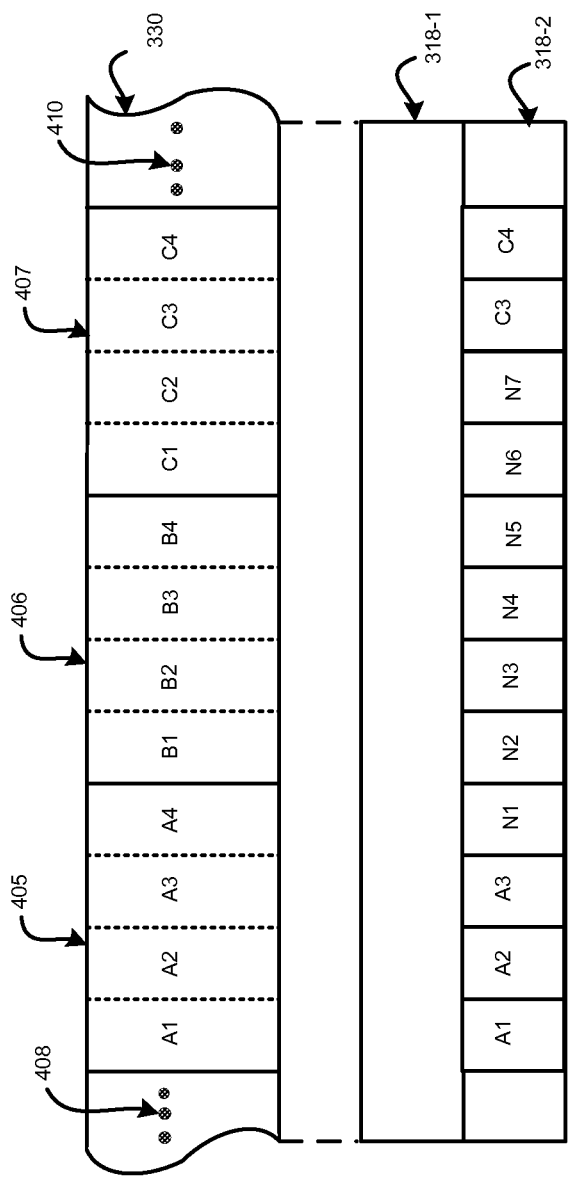

Next, disc drive 300 updates data entry A4 with data packet A1, updates data packets B1-B4 with data packets N2-N5 and updates data packets C1-C2 with data packets N6-N7. These operations constitute the "modify" aspects of the read-modify-write process. The result of these operations are illustrated in FIG. 4E, which shows portion 318-1 of second cache 318 empty because its contents have been "moved" into second portion 318-2 to replace data entries A4, B1-B4 and C1-C2.

Figure 4F:
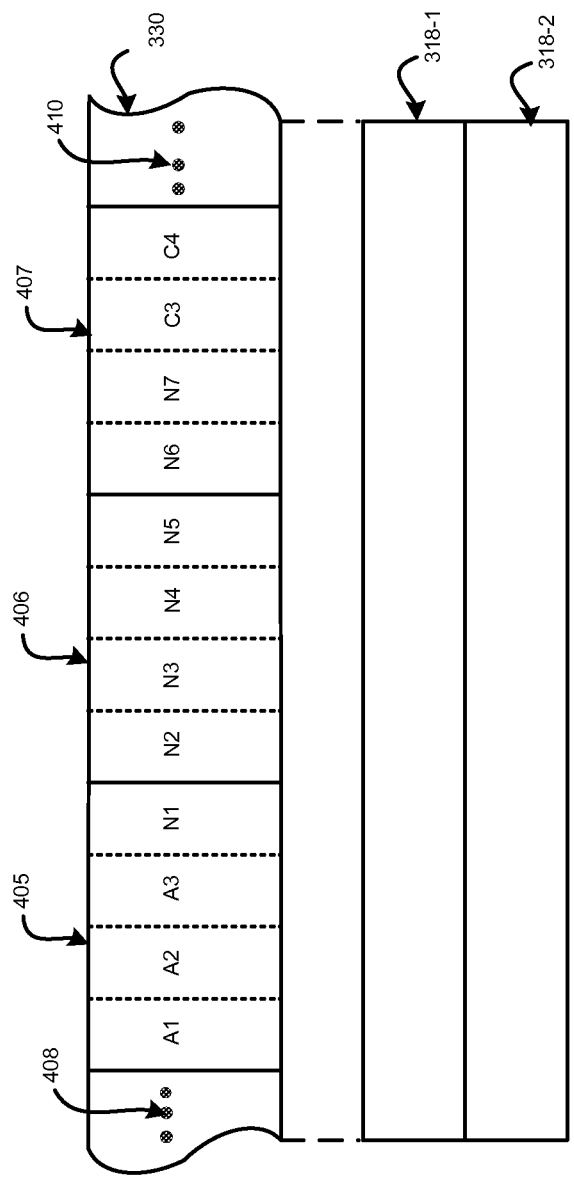

After modifying the cached data retrieved from sectors 405, 406 and 407, the disc drive 300 proceeds to transfer the modified data from the second portion of second cache 318 to sectors 405, 406 and 407. The result of this particular process, which encompasses the "write" aspects of the read-modify-write process, is shown in FIG. 4F.

It should be noted that although second cache or buffer 318 is shown as a single memory unit in FIG. 3A, is can comprise multiple sections or even multiple memory chips with individual ones of the memory chips even being of different memory types. For example, buffer memory 318 can include a first section or first memory chip, which may be a non-volatile memory (NVM) 321, and a second section or second memory chip that may be a volatile memory (VM) 323. In some embodiments, NVM 321 has a substantially lower capacity and lower access time than data storage medium 312. Also, in some embodiments, NVM 321 has a substantially lower capacity than VM 323. In some embodiment, memory 321 is at least as rewritable as data storage medium 312 or VM 323. In such embodiments, memory 321 is non-volatile (NV)-backed (where solid state memory is employed only upon power loss to device 300 to archive what is NV-protected in second cache 318). NVM 321 may be used to temporarily store write commands when they are first received from a sending interface. When the write commands in the NVM 321 reach a predetermined threshold, for example, they are transferred to data storage medium 312. The transfer of data from NVM 321 to data storage medium 312 may be carried out when disc drive 300 is idle, for example. Thus, by employing NVM 321, which does not lose its data upon power loss, drive 300 may neglect to substantially immediately transfer data received from the sending interface to data storage medium 312. VM 323 may be used by disc drive 300 for temporary data storage while carrying out, for example, read-modify-write operations. In such embodiments that include NVM 321, VM 323 and first cache 336, different data paths may be employed to manage data as the data is being transferred to its intended destination locations (for example, destination locations on track 330). Examples of data transfer paths are as follows:

1) From sending interface to VM 323 and then directly to the intended destination locations. This path may be utilized when host data packet sizes correspond to the intended destination location sizes (i.e., utilized for storage of "aligned" packets in their intended destination locations). In general, this path may be utilized when no read-modify-write operations are need for storage of received data in the intended destination locations.
2) From sending interface to NVM 321 and then directly to the intended destination locations. Here, the data, when first received from the sending interface, may be stored in NVM 321. Subsequently, any aligned packets of the data from NVM 321 may be directly transferred from NVM 321 to their intended destination locations.
3) From sending interface to NVM 321; from NVM 321 to first cache 336; from first cache 336 to VM 323 as part of a read-modify-write operation; from VM 323 to the intended destination locations to complete the write part of the read-modify-write operation.

The example provided in connection with FIGS. 4C through 4F describes different steps taken to carry out a read-modify-write process on a small number of data packets. Typically, read-modify-write processes are carried out on a large number a write commands with numerous packets of data corresponding to the different commands. As noted earlier, each of the packets of data in each command is addressed by a LBA and has a physical destination location on a data storage medium in a data storage device. A large number of commands and data packets may include different sets of packets, with some of the different sets of packets destined for locations on disc 312 that are spaced apart from other ones of the different sets of packets. For example, in a large group of packets, packets N1-N7 may be addressed by LBAs 0001-0007, packets P1-P10 may be addressed by LBAs 0020-0029 and packets X1-X10 may be addressed by LBAs 1001-1010. Here, it may be efficient to process write commands that include packets N1-N7 and P1-P10 together in one group based on proximity of LBAs, and then separately process packets X1-X10 in a different group, which is again based on proximity of LBAs. Also, even if each of N1-N7 were sent to the data storage device in separate non-sequential commands, it would be efficient to execute these commands sequentially, preferably during one disc rotation, because they are destined for contiguous locations 405, 406 and 407 on disc 312. A general method embodiment for receiving and processing write commands in data storage devices such as 108, 200 and 300 is described below in connection with FIG. 5.

Figure 5:
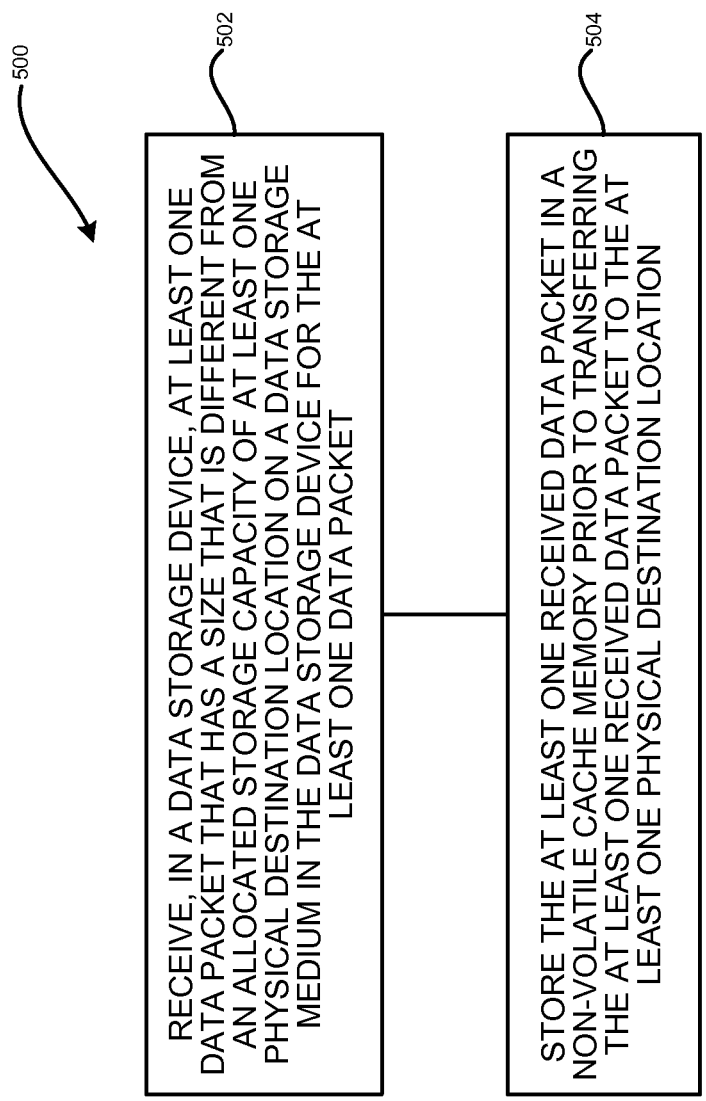
FIG. 5 is a flow diagram of a data storage method in accordance with one embodiment.

As described above, in some embodiments, the first cache may comprise a media cache and the second cache may comprise a non-volatile cache memory. A media cache may, for example, be a cache that resides in a same type of memory, or on a same type of storage medium, that includes the final physical destination locations for data packets that are received in the data storage device. In some exemplary embodiments, the non-volatile cache resides in a different type of memory than the media cache. Examples of a media cache are a cache on a portion of an optical storage medium (for example, an optical storage disc) and a cache on a portion of a magnetic storage medium (for example, a magnetic storage disc), where the optical storage medium and magnetic storage medium include final physical destination locations for user data. Referring to FIG. 5, a very simplified flow diagram of a particular illustrative embodiment of a method of memory management is shown and generally designated 500. The method 500 may include receiving, in a data storage device, at least one data packet that has a size that is different from an allocated storage capacity of at least one physical destination location on a data storage medium in the data storage device for the at least one data packet, at 502. The method may then include storing the at least one received data packet in a non-volatile cache memory prior to transferring the at least one received data packet to the at least one physical destination location, at 504.

In accordance with various embodiments, the methods described herein may be implemented as one or more software programs running on one or more computer processors or controllers, such as those included in devices 108, 200 and 300. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A disc drive comprising:
   a first cache memory, wherein the first cache memory is a media cache that is a portion of non-volatile data storage media that include final physical destination locations for data packets received in the disc drive, wherein the non-volatile data storage media comprise one or more non-volatile data storage discs, and wherein the first cache memory is a portion of the one or more non-volatile data storage discs;
   a volatile cache memory;
   a non-volatile cache memory of a different type than the first cache memory, the non-volatile cache memory being physically separate from the data storage media; and
   a controller configured to:
      temporarily store at least some of the received data packets in the non-volatile cache memory;
      when the at least some of the received data packets reach a predetermined number of data packets in the non-volatile cache memory, transfer the predetermined number of data packets from the non-volatile cache memory to the first cache memory prior to storing the predetermined number of data packets in at least some of the final physical destination locations in the disc drive;
      group the predetermined number of data packets transferred to the first cache memory into different subsets based on proximity of logical block addresses of different one of the predetermined number of data packets, wherein the first cache memory is the portion of the one or more non-volatile data storage discs;
      transfer any one of the subsets of data packets from said first cache memory, which is the portion of the one or more non-volatile data storage discs, to the volatile cache memory, and transfer any existing data in the final physical destination locations for the subset to the volatile cache memory;
      update the transferred existing data with the data packets of the subset in the volatile cache memory to obtain modified data; and
      commit the modified data to the final physical destination locations for the subset.

2. The disc drive of claim 1 and wherein each of the at least some of the received data packets has a size that is different from an allocated storage capacity of each of the at least some of the final physical destination locations.

3. The disc drive of claim 2 and wherein received data packets other than the at least some of the received data packets each have a size that corresponds to the allocated storage capacity of each of the final physical destination locations.

4. The disc drive of claim 3 and wherein the controller is further configured to:
   temporarily store each received data packet, which has the size that corresponds to the allocated storage capacity of the final physical destination location, in the volatile cache memory; and
   directly transfer the temporarily stored received data packets, which each has the size that corresponds to the allocated storage capacity of the final physical destination location, form the volatile cache memory to the intended final physical destination locations.

5. The disc drive of claim 3 and wherein the controller is further configured to:
   temporarily store each received data packet, which has the size that corresponds to the allocated storage capacity of the final physical destination location, in the non-volatile cache memory; and
   directly transfer the temporarily stored received data packets, which each has the size that corresponds to the allocated storage capacity of the final physical destination location, from the non-volatile cache memory to the intended final physical destination locations.

6. The disc drive of claim 1 and wherein the non-volatile cache memory is a solid state memory.

7. The disc drive of claim 6 and wherein the non-volatile cache memory has a substantially lower capacity than the volatile cache memory.

8. The disc drive of claim 1 and wherein the data storage media are one of magnetic storage media or optical storage media.

9. The disc drive of claim 1 and wherein the data packets are addressed by logical block addresses (LBAs).

10. The disc drive of claim 1 and wherein the non-volatile cache memory is as rewritable as the data storage media.

11. A method implemented in a disc drive, the method comprising:
    providing a first cache memory, wherein the first cache memory is a media cache that is a portion of non-volatile data storage media that include final physical destination locations for data packets received in the disc drive, wherein the non-volatile data storage media comprises one or more non-volatile data storage discs, and wherein the first cache memory is a portion of the one or more non-volatile data storage discs;
    providing a volatile cache memory;
    providing a non-volatile cache memory of a different type than the first cache memory, the non-volatile cache memory being physically separate from the data storage media;
    temporarily storing at least some of the received data packets in the non-volatile cache memory;
    when the at least some of the received data packets reach a predetermined number of data packets in the non-volatile cache memory, transferring the predetermined number of data packets from the non-volatile cache memory to the first cache memory prior to storing the predetermined number of data packets in at least some of the final physical destination locations in the disc drive;
    grouping the predetermined number of data packets transferred to the first cache memory into different subsets based on proximity of logical block addresses of different ones of the predetermined number of data packets, wherein the first cache memory is the portion of the one or more non-volatile data storage discs;
    transferring any one of the subsets of data packets from said first cache memory, which is the portion of the one or more non-volatile data storage discs, to the volatile cache memory, and transferring any existing data in the final physical destination locations for the subset to the volatile cache memory;
    updating the transferred existing data with the data packets of the subset in the volatile cache memory to obtain modified data; and
    committing the modified data to the final physical destination locations for the subset.

12. The method of claim 11 and wherein each of the at least some of the received data packets has a size that is different from an allocated storage capacity of each of the at least some of the final physical destination locations.

13. The method of claim 12 and wherein received data packets other than the at least some of the received data packets each have a size that corresponds to the allocated storage capacity of each of the final physical destination locations.

14. The method of claim 13 and further comprising:
temporarily storing each received data packet, which has the size that corresponds to the allocated storage capacity of the final physical destination location, in the volatile cache memory; and
directly transferring the temporarily stored received data packets, which each has the size the corresponds to the allocated storage capacity of the final physical destination location, from the volatile cache memory to the intended final physical destination locations.

15. The method of claim 13 and further comprising:
temporarily storing each received data packet, which has the size that corresponds to the allocated storage capacity of the final physical destination location, in the non-volatile cache memory; and
directly transferring the temporarily stored received data packets, which each has the size that correspond to the allocated storage capacity of the final physical destination location, from the non-volatile cache memory to the intended final physical destination location.

16. The method of claim 11 and wherein providing the non-volatile cache memory includes providing a non-volatile solid state cache memory.

17. The method of claim 16 and wherein the non-volatile cache memory has a substantially lower capacity than the volatile cache memory.

18. The method of claim 11 and wherein the data storage media are one of magnetic storage media or optical storage media.

19. The method of claim 11 and further comprising addressing the data packets by logical block addresses (LBAs).

20. The method of claim 11 and wherein the non-volatile cache memory is as rewritable as the data storage media.

* * * * *